United States Patent
Pabalate

(10) Patent No.: US 11,440,447 B2
(45) Date of Patent: Sep. 13, 2022

(54) ARMREST INERTIAL LATCH HAVING ANTI-REVERSE LOCK FOR ABSORBING DYNAMIC OSCILLATION DURING VEHICLE IMPACT

(71) Applicant: Ford Global Technologies, LLC, Dearborn, MI (US)

(72) Inventor: Nathan Pabalate, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 17/068,254

(22) Filed: Oct. 12, 2020

(65) Prior Publication Data

US 2022/0111778 A1     Apr. 14, 2022

(51) Int. Cl.
  *B60N 2/40*     (2006.01)
  *B60N 2/433*    (2006.01)
  *B60N 2/75*     (2018.01)
  *B60N 3/10*     (2006.01)
  *B60N 2/20*     (2006.01)

(52) U.S. Cl.
  CPC .............. *B60N 2/433* (2013.01); *B60N 2/206* (2013.01); *B60N 2/757* (2018.02); *B60N 2/793* (2018.02); *B60N 3/102* (2013.01)

(58) Field of Classification Search
  CPC ........ B60N 2/433; B60N 2/757; B60N 2/793; B60N 2/206; B60N 3/102
  See application file for complete search history.

(56) References Cited

U.S. PATENT DOCUMENTS

| 4,118,067 A | 10/1978 | Tanaka |
| 4,909,571 A | 3/1990 | Vidwans et al. |
| 6,736,438 B1 | 5/2004 | Wieclawski |
| 7,748,778 B1 | 7/2010 | Udriste et al. |
| 7,780,234 B2 | 8/2010 | Grable et al. |
| 8,342,605 B2 | 1/2013 | Tanaka et al. |
| 10,696,204 B2 * | 6/2020 | Stewart ................ B60N 2/78 |

FOREIGN PATENT DOCUMENTS

| CN | 105799565 | 7/2016 |
| DE | 20200810444 | 1/2009 |
| EP | 1678004 | 7/2006 |
| JP | 6704906 | 6/2020 |

* cited by examiner

*Primary Examiner* — Syed A Islam
(74) *Attorney, Agent, or Firm* — Vichit Chea; Price Heneveld LLP

(57) ABSTRACT

A vehicle seat assembly includes a seatback rotationally coupled to a base at a seat pivot. A securing pin is coupled with the seatback. An inertial latch is operable about a latch pivot to define an idle position defined by the inertial latch biased distal from the securing pin, and a deployed position defined by an opposing directional force biasing the inertial latch into selective engagement with the securing pin wherein the seatback is maintained in a predetermined rotational position. A guide latch is biased against the inertial latch and having an idle notch and a deployed notch. The idle notch selectively maintains the inertial latch in the idle position. The deployed notch secures the inertial latch in the deployed position in response to the opposing directional biasing force.

19 Claims, 10 Drawing Sheets

ARMREST INERTIAL LATCH HAVING ANTI-REVERSE LOCK FOR ABSORBING DYNAMIC OSCILLATION DURING VEHICLE IMPACT

FIELD OF THE DISCLOSURE

The present disclosure generally relates to vehicle seating, and more specifically, a vehicle seating assembly that incorporates an inertial latch having an anti-reverse feature that absorbs dynamic oscillation forces experienced during a vehicle collision.

BACKGROUND OF THE DISCLOSURE

The seating position within vehicles typically includes seatbacks that are rotationally operable between various rotational positions to recline the seatback or to fold the seatback down for adding cargo space within the vehicle. During a vehicle impact, it is desirable to lock a seatback in place to prevent the seatback from rotating forward as a result of the forces experienced during the vehicle collision.

SUMMARY OF THE DISCLOSURE

According to a first aspect of the present disclosure, a vehicle seat assembly includes a seatback rotationally coupled to a base at a seat pivot. A securing pin is coupled with the seatback. An inertial latch is operable about a latch pivot to define an idle position defined by the inertial latch biased distal from the securing pin, and a deployed position defined by an opposing directional force biasing the inertial latch into selective engagement with the securing pin wherein the seatback is maintained in a predetermined rotational position. A guide latch is biased against the inertial latch and having an idle notch and a deployed notch. The idle notch selectively maintains the inertial latch in the idle position. The deployed notch secures the inertial latch in the deployed position in response to the opposing directional biasing force.

Embodiments of the first aspect of the present disclosure can include any one or a combination of the following features:
- the guide latch is in continual sliding engagement with the inertial latch;
- the inertial latch slides along a notch surface of the guide latch from the idle notch to the deployed notch in response to the opposing directional biasing force;
- the guide latch rotationally operates about a guide pivot that is distal from each of the seat pivot and the latch pivot;
- a biasing mechanism extends between the guide latch and the inertial latch and maintains the guide latch in the continual sliding engagement with the inertial latch;
- the biasing mechanism biases the inertial latch toward the idle position and biases the guide latch toward the inertial latch;
- the inertial latch in the deployed position engages a top portion of the securing pin and prevents forward rotation of the seatback;
- the inertial latch in the idle position defines an offset between the inertial latch and the securing pin, wherein the securing pin is rotationally operable with the seatback and within the offset between a plurality of rotational positions;
- the securing pin is rearward of the seat pivot, and wherein rotational operation of the seatback from an upright position to a downward position defines an initial upward rotation of the securing pin relative to the inertial latch; and
- the inertial latch includes a downwardly extending weighted member that is acted on by the opposing directional biasing force toward the deployed position.

According to a second aspect of the present disclosure, a vehicle seat includes a base having a seat pivot, a latch pivot and a guide pivot. A seatback is rotationally operable about the seat pivot between a plurality of rotational positions. A securing pin is attached to the seatback and operable about the seat pivot. A latching assembly includes an inertial latch that operates about the latch pivot and a guide latch that operates about the guide pivot. The inertial latch and the guide latch are biased toward one another and slidably operate against one another between an idle position and a deployed position. The guide latch includes a notch surface that selectively retains the inertial latch in the idle position distal from the securing pin and, in response to an opposing directional biasing force, secures the inertial latch in the deployed position that places the inertial latch into selective engagement with a top portion of the securing pin and holding the seatback in a selected position of the plurality of rotational positions.

Embodiments of the second aspect of the present disclosure can include any one or a combination of the following features:
- the notch surface includes an idle notch and a deployed notch, wherein the inertial latch slidably operates in response to the opposing directional biasing force from the idle notch to the deployed notch;
- the deployed notch secures the inertial latch in the deployed position and resists residual oscillating forces subsequently resulting from the opposing directional biasing force;
- the inertial latch is in continual sliding engagement with the notch surface of the guide latch;
- a biasing mechanism extends between the guide latch and the inertial latch and maintains the guide latch in the continual sliding engagement with the inertial latch;
- the biasing mechanism biases the inertial latch toward the idle position and biases the guide latch toward the inertial latch;
- the inertial latch in the idle position defines an offset between the inertial latch and the securing pin and the securing pin is rotationally operable with the seatback and within the offset between the plurality of rotational positions; and
- the inertial latch includes a downwardly extending weighted member that is acted on by the opposing directional biasing force toward the deployed position.

According to a third aspect of the present disclosure, a method for operating a seatback for a seat assembly of a vehicle includes placing an inertial latch within an idle position relative to a guide latch. The seatback is positioned in a selected position of a plurality of rotational positions that locates a securing pin within an offset. An opposing directional force is applied that biases the inertial latch to a deployed position. The inertial latch is rotated to the deployed position wherein the inertial latch slides along a notch surface of the guide latch to a deployed notch. The inertial latch is retained in the deployed notch to maintain the inertial latch in the deployed position. Residual oscillating forces are applied, subsequently resulting from the opposing directional biasing force, wherein the inertial latch remains within the deployed position.

Embodiments of a third aspect of the present disclosure can include any one or a combination of the following feature:
  preventing forward rotation of the seatback away from the selected position when the inertial latch is in the deployed position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
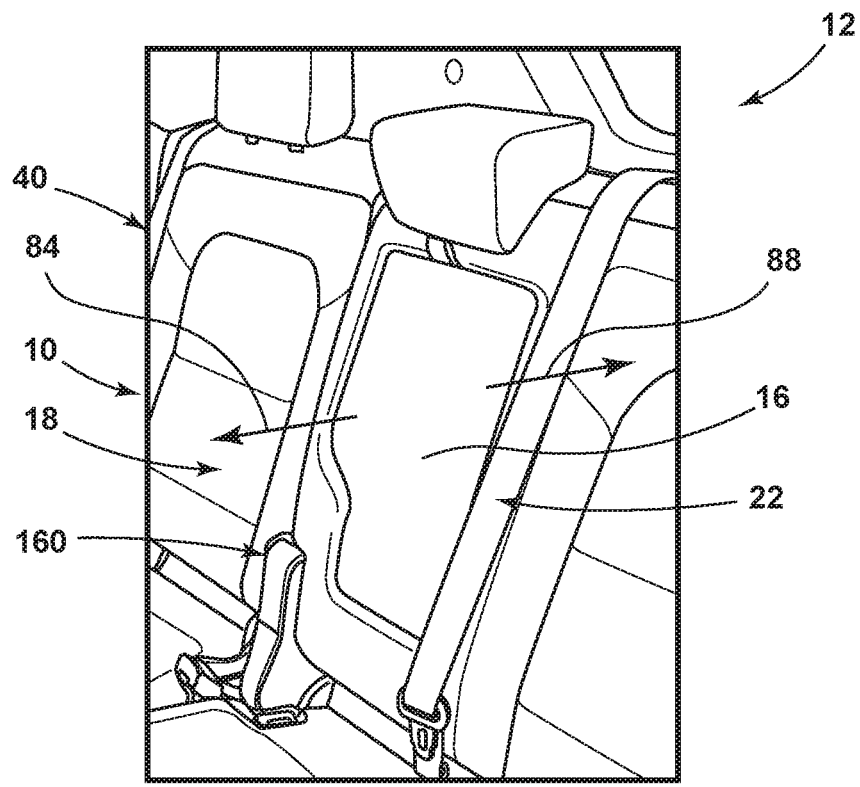
FIG. 1 is a side perspective view of a passenger compartment illustrating an armrest/seatback located in an upright position.
Figure 2:
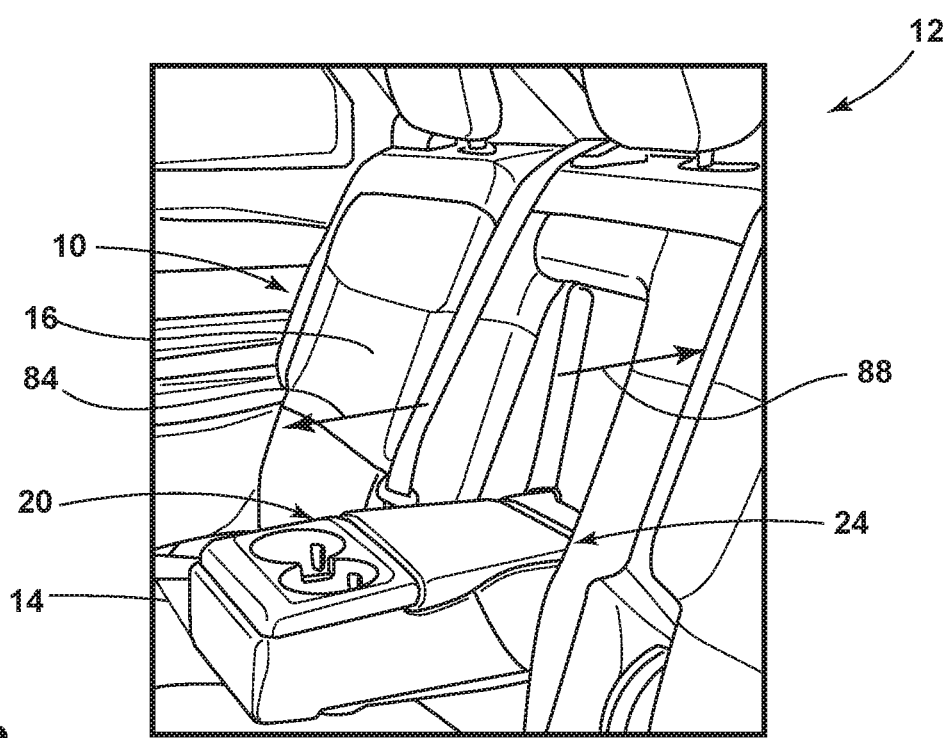
FIG. 2 is a side perspective view of the vehicle of FIG. 1 showing the armrest/seatback in a downward position.
Figure 3:
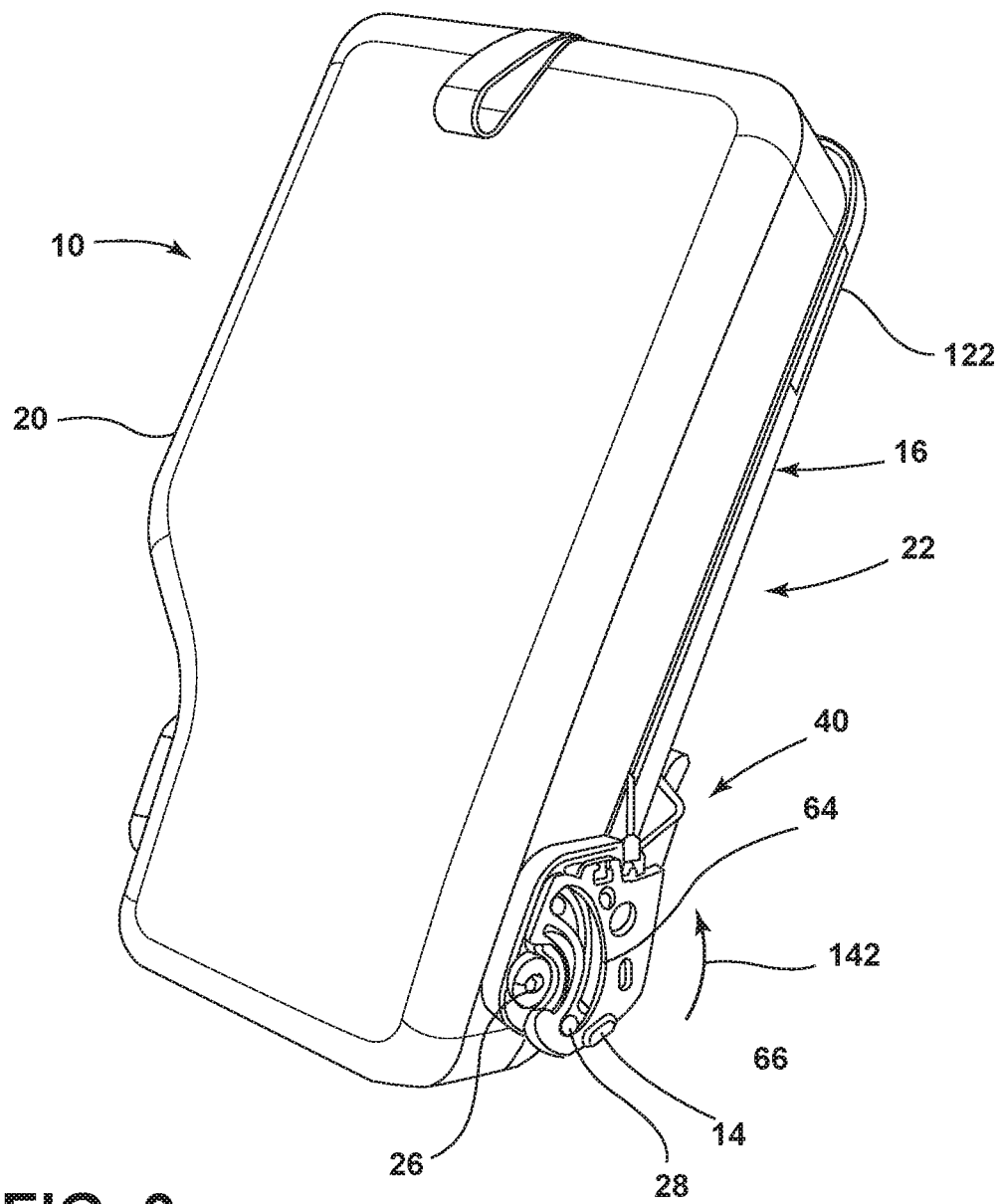
FIG. 3 is a side perspective view of an aspect of an armrest/seatback incorporating an aspect of the inertial latch.
Figure 4:
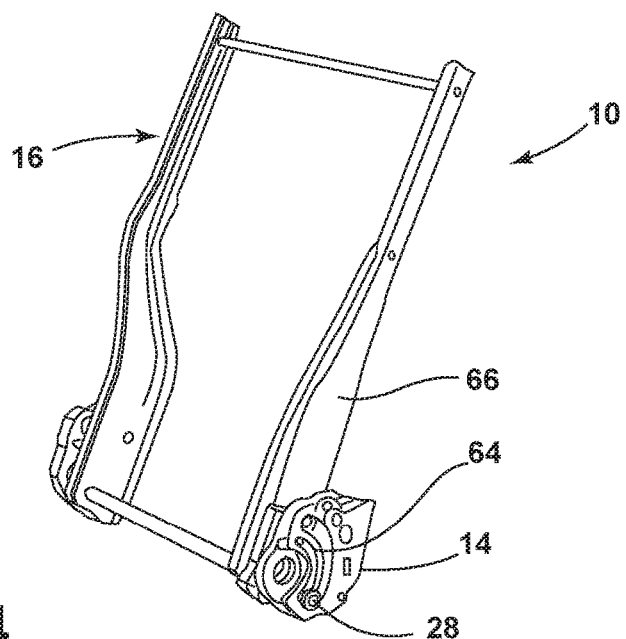
FIG. 4 is a side perspective view of an interior frame for the armrest/seatback of FIG. 3.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As exemplified in FIGS. 1-9, reference numeral 10 generally refers to a seating position within a vehicle 12, wherein the seating position 10 includes a base 14 and a seatback 16. The seatback 16 is typically relatively operational relative to the base 14 to define a plurality of rotating positions 18 for the seating position 10. In certain seating positions 10 within a vehicle 12, the seatback 16 may be in the form of an armrest 20 that operates as a seatback 16 in an upright position 22 and can operate as an armrest 20 in a downward position 24. According to various aspects of the device, the seat assembly for the vehicle 12 includes the seatback 16 that is rotationally coupled to the base 14 at a seat pivot 26. A securing pin 28 is coupled with the seatback 16. An inertial latch 30 is operable about a latch pivot 32 to define an idle position 34. This idle position 34 is defined by the inertial latch 30 biased distal from the securing pin 28. The inertial latch 30 is also operable to a deployed position 36 that is defined by an opposing directional biasing force 38 that biases the inertial latch 30 into selective engagement with the securing pin 28. In this deployed position 36, the seatback 16 is maintained in a predetermined rotational position 40 relative to the base 14. Typically, this predetermined rotational position 40 is the upright position 22 or a position substantially near the upright position 22. It is also contemplated that this predetermined rotational position 40 can be the downward position 24, according to various aspects of the device. A guide latch 42 is biased against the inertial latch 30. This guide latch 42 includes an idle notch 44 and a deployed notch 46. The idle notch 44 selectively maintains the inertial latch 30 in the idle position 34. The deployed notch 46 secures the inertial latch 30 in the deployed position 36 in response to the opposing directional biasing force 38.

Referring again to FIGS. 1-9, the guide latch 42 is positioned relative to the inertial latch 30 such that the guide latch 42 is in continual sliding engagement 48 with the inertial latch 30. In this manner, the inertial latch 30 slides along a notch surface 50 of the guide latch 42 from the idle notch 44 and to the deployed notch 46 in response to the opposing directional biasing force 38. Through this configuration, the inertial latch 30 and the guide latch 42 form a latching assembly 52 that operate in combination with one another to maintain the continual sliding engagement 48 between the guide latch 42 and the inertial latch 30.

As exemplified in FIGS. 5-8, a biasing mechanism 60 extends between the guide latch 42 and the inertial latch 30 and biases the guide latch 42 and the inertial latch 30 toward one another to form the continual sliding engagement 48 between these components of the latching assembly 52. The guide latch 42 is configured to rotationally operate about a guide pivot 62 that is distal from each of the seat pivot 26 and the latch pivot 32. Through this configuration, when the inertial latch 30 is retained in the idle position 34 and within the idle notch 44 of the guide latch 42, the inertial latch 30 is maintained outside of an operational path 64 of the securing pin 28 that is coupled with the seatback 16. Accordingly, when the inertial latch 30 is in the idle position 34, the seatback 16 can be rotated, as desired by the user, between the upright and downward positions 22, 24. The operational path 64 is typically defined by a channel or slot within a frame 66 of the base 14.

Figure 7:
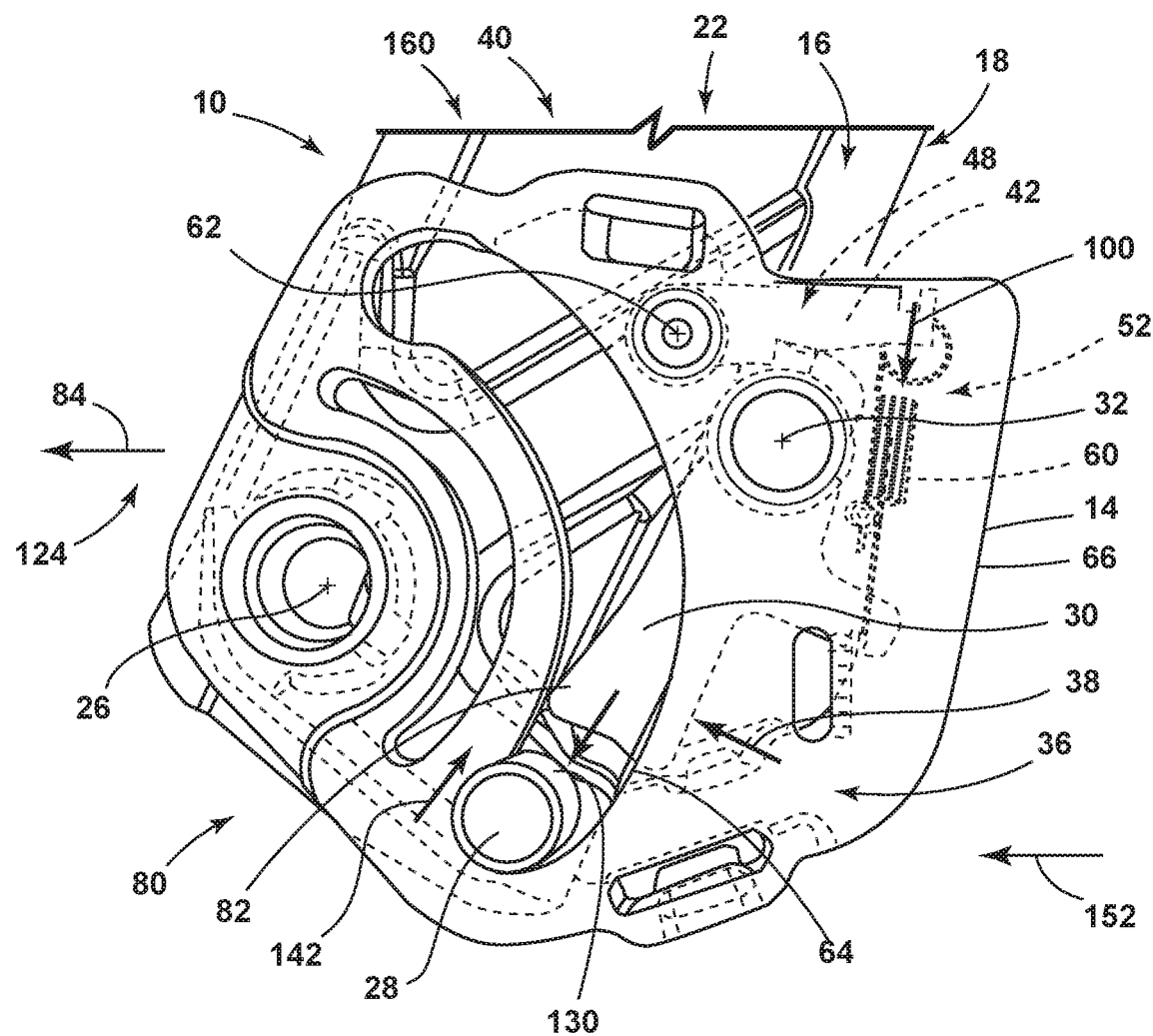
FIG. 7 is a detail perspective view of the inertial latch of FIG. 5 shown in the deployed position.
Figure 8:
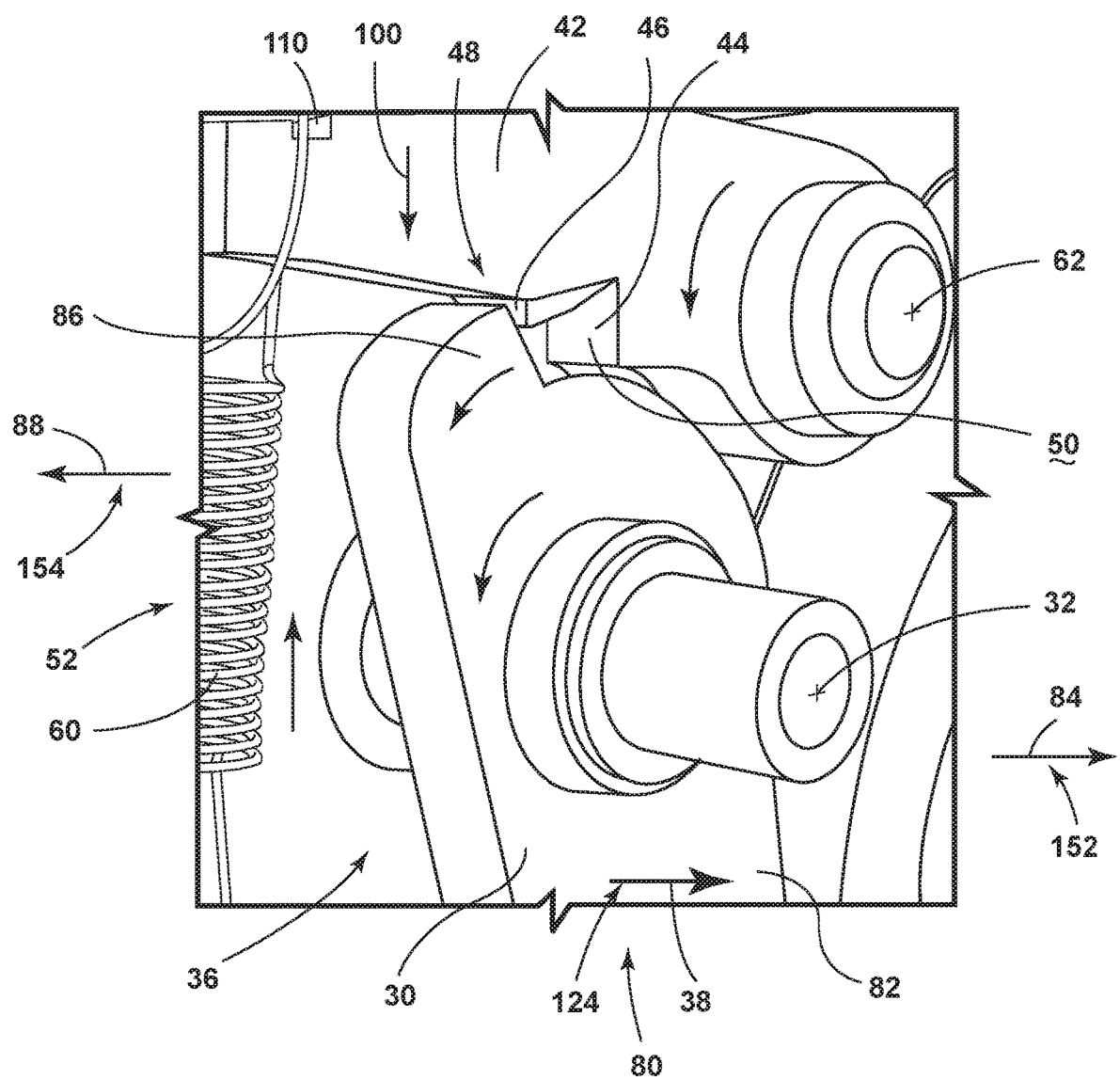
FIG. 8 is a detail perspective view of the inertial latch of FIG. 7.
Figure 9:
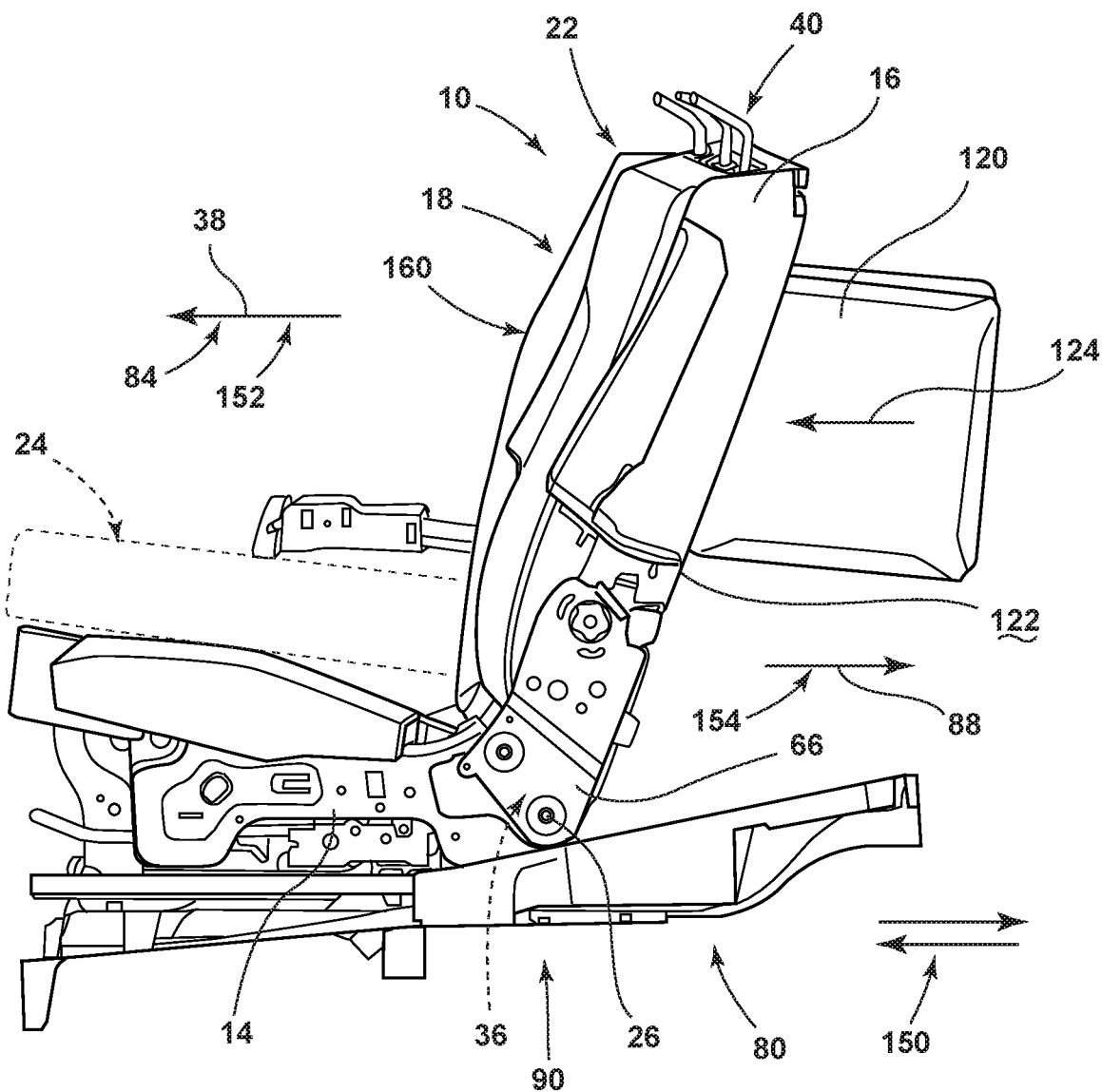
FIG. 9 is a schematic perspective view of an aspect of a seating position and showing a piece of cargo impacting the seatback during an impact condition of a vehicle.

As exemplified in FIGS. 7 and 8, when the vehicle 12 experiences an impact condition 80, such as a collision, the vehicle 12 experiences an extreme deceleration. This extreme deceleration results in the opposing directional biasing force 38. This opposing directional biasing force 38 acts upon a downwardly extending weighted member 82 of the inertial latch 30. This weighted member 82 is initially biased in a vehicle forward direction 84 and toward the operational path 64 of the securing pin 28. Through this configuration, the opposing directional biasing force 38 causes the weighted member 82 to rotate about the latch pivot 32 and in a vehicle forward direction 84. Simultaneously, an engaging member 86 of the inertial latch 30 slides along the notch surface 50 of the guide latch 42 in a vehicle rearward direction 88. This sliding engagement 48 between the engaging member 86 of the inertial latch 30 and the notch surface 50 of the guide latch 42 causes the engaging member 86 to slide out of the idle notch 44 and into the deployed notch 46.

Referring again to FIGS. 7 and 8, once in the deployed notch 46, the inertial latch 30 is maintained in the deployed position 36. As will be discussed more fully below, securing the inertial latch 30 in the deployed position 36 serves to counteract various dynamic oscillating forces 90 that are experienced by a vehicle 12 during an impact condition 80. These dynamic oscillating forces 90 have been shown to result in the opposing directional biasing force 38 operating in both the vehicle forward and vehicle rearward directions 84, 88 over the course of a particular impact condition 80. By maintaining the inertial latch 30 in the deployed position 36, the dynamic oscillations 150 of the opposing directional biasing force 38 are addressed throughout the impact condition 80 such that the inertial latch 30 is maintained in the deployed position 36 and the seatback 16 is, likewise, maintained in the upright position 22 throughout the course of the impact condition 80.

Referring again to FIGS. 4-8, the biasing mechanism 60 of the latching assembly 52 tends to bias the guide latch 42 and the inertial latch 30 toward the idle position 34. Accordingly, the opposing directional biasing force 38, in order to move the inertial latch 30 to the deployed position 36, must be sufficient to overcome the latch biasing force 100 exerted by the biasing mechanism 60, as well as the frictional engagement defined between the engaging member 86 of the inertial latch 30 and the notch surface 50 of the guide latch 42. Typically, the opposing directional biasing force 38 during an impact condition 80 is multiple times the force of gravity. Such forces are typically seen during a head-on collision, as well as other similar impact conditions 80 that result in an extreme deceleration of the vehicle 12.

During the impact condition 80, where the opposing directional biasing force 38 is sufficient to move the inertial latch 30 to the deployed position 36, connecting bodies 110 of the guide latch 42 and the inertial latch 30, which are attached to one another via the biasing mechanism 60, are moved away from one another. Through this motion of the inertial latch 30 from the idle position 34 to the deployed position 36, the biasing mechanism 60 is extended as the opposing directional biasing force 38, in its initial stages, overcomes the latch biasing force 100 of the biasing mechanism 60. When the engaging member 86 of the inertial latch 30 reaches a deployed notch 46 of the guide latch 42, the latching assembly 52 is secured in the deployed position 36. This positioning of the latching assembly 52 increases the latch biasing force 100 and maintains the inertial latch 30 in the deployed position 36 to prevent operation of the securing pin 28 through the operational path 64. Accordingly, during an impact condition 80, certain cargo 120 may accelerate toward a rear surface 122 of the seatback 16 at a high rate of speed. Engagement of the securing pin 28 with the inertial latch 30 in the deployed position 36 prevents the impact of this cargo 120 against the rear surface 122 of the seatback 16 from moving the seatback 16 away from the upright position 22. Accordingly, an occupant of the vehicle 12 in such a seating position 10 will likely experience only a small fraction of the impact force 124 of the cargo 120 hitting the rear surface 122 of the respective seatback 16.

Figure 5:
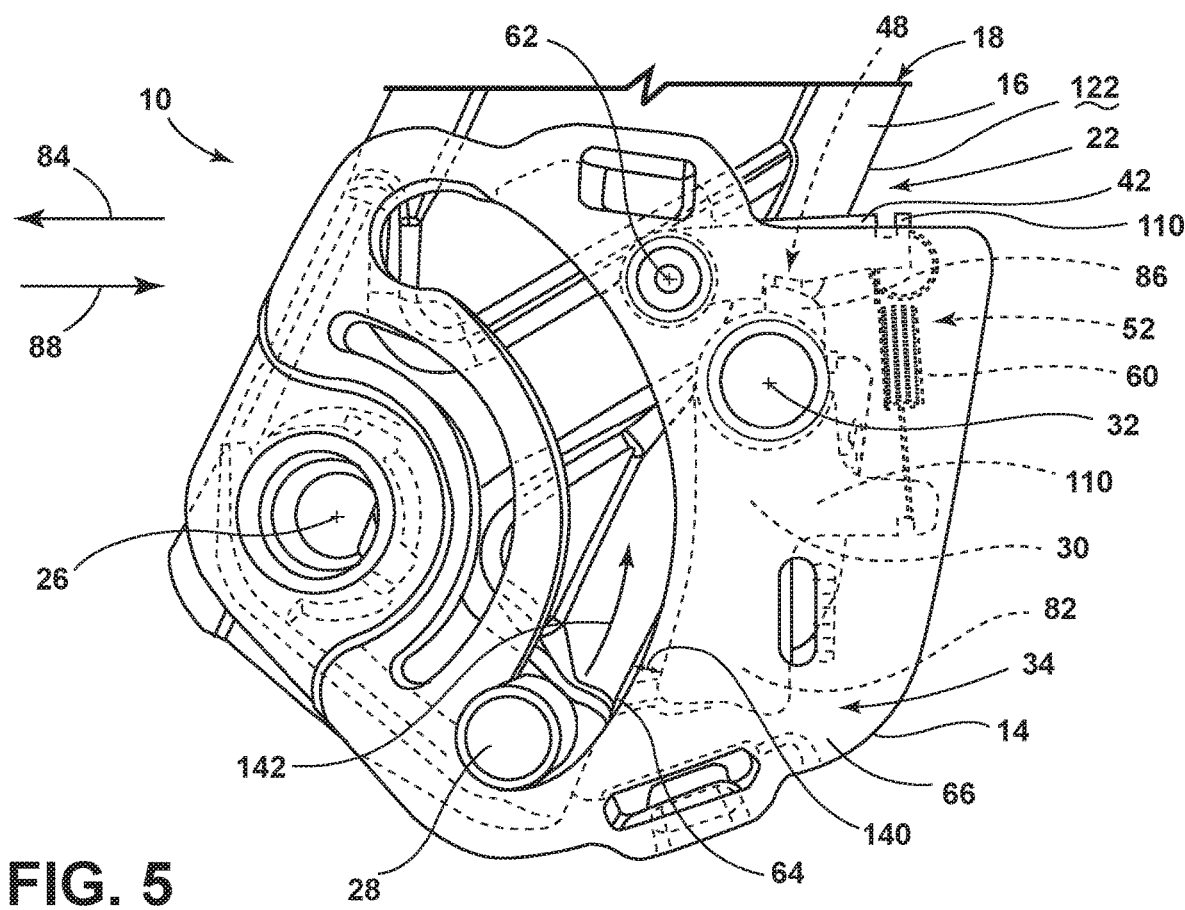
FIG. 5 is a detail perspective view of an aspect of the inertial latch shown in the idle position.
Figure 6:
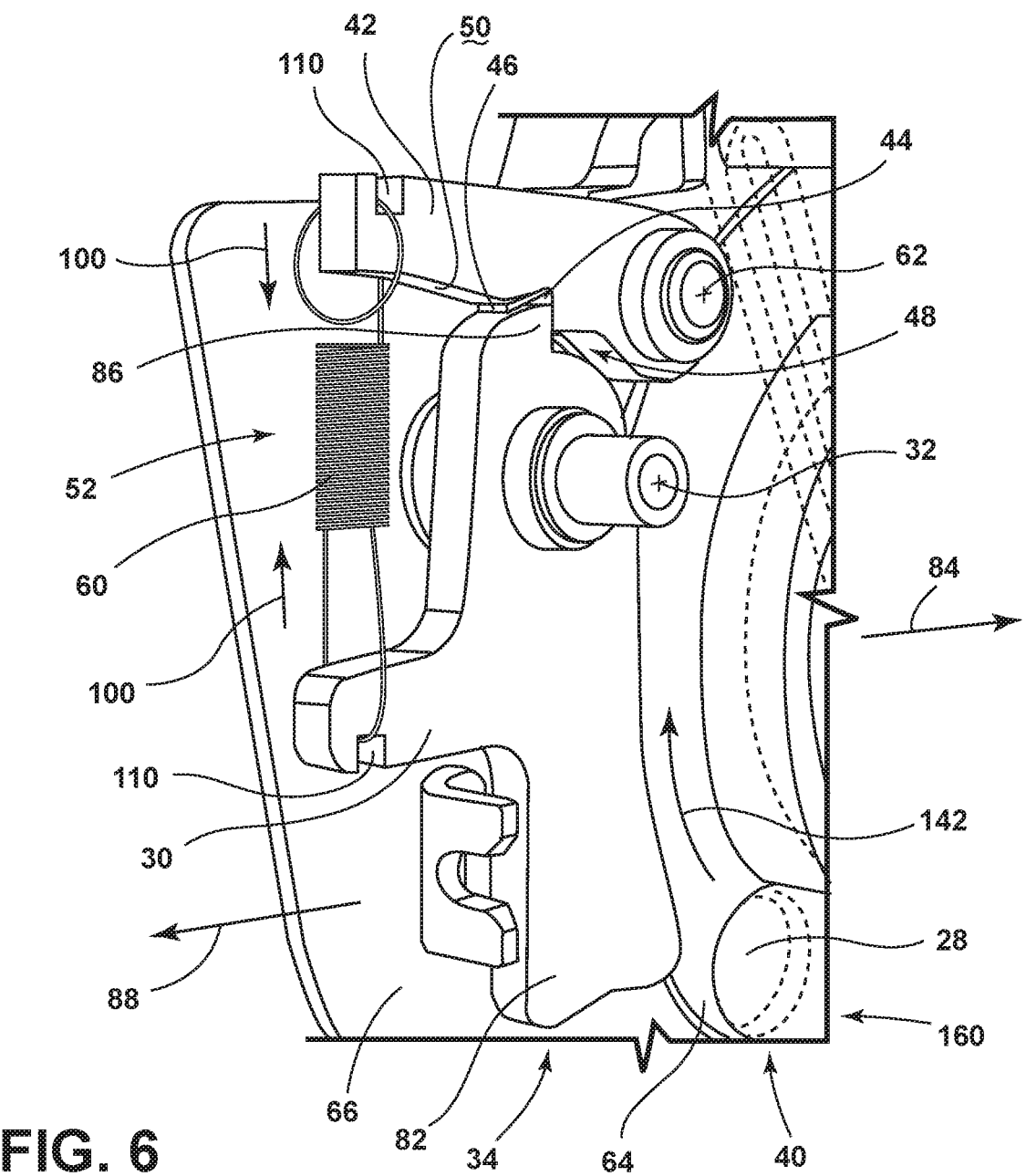
FIG. 6 is a detail perspective view of an aspect of the inertial latch of FIG. 5.

As exemplified in FIGS. 5-7, when the inertial latch 30 moves from the idle position 34 to the deployed position 36, the downward extending weighted member 82 of the inertial latch 30 moves into the operational path 64 of the securing pin 28 and is positioned to engage a top portion 130 of the securing pin 28. This positioning of the weighted member 82 of the inertial latch 30 prevents forward rotation of the seatback 16 away from the upright position 22, as the securing pin 28 is prevented from moving through the operational path 64.

Referring again to FIGS. 5-9, the inertial latch 30 in the idle position 34 defines an offset 140 between the inertial latch 30 and the securing pin 28. While in the idle position 34, the securing pin 28 is rotationally operable along with the seatback 16 and within the offset 140 between the plurality of rotational positions 40. Stated another way, in the idle position 34, the weighted member 82 of the inertial latch 30 remains outside of the operational path 64 for the securing pin 28 such that the securing pin 28 and, in turn, the seatback 16 can rotate through the plurality of rotational positions 40. The securing pin 28 is positioned rearward of the seat pivot 26. Rotational operation of the seatback 16 from the upright position 22 to the downward position 24 defines an initial upward rotation 142 of the securing pin 28 relative to the seat pivot 26 and the inertial latch 30. Accordingly, as the inertial latch 30 moves into the deployed position 36, upward rotation 142 of the securing pin 28 through the operational path 64 is prevented by the weighted member 82 of the inertial latch 30 blocking this operational path 64 in the deployed position 36.

Figure 10:
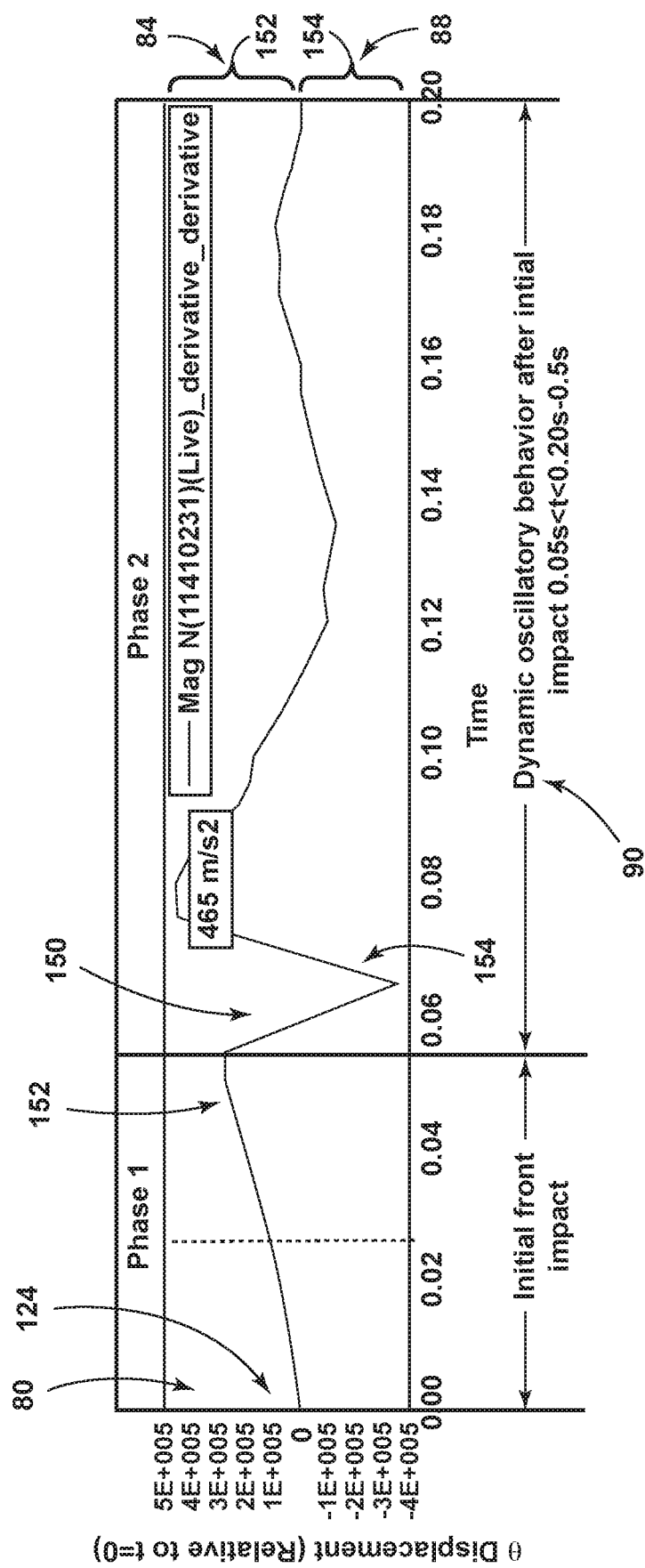
FIG. 10 is a schematic diagram illustrating the relative forces experienced within a vehicle seatback during an exemplary impact condition.
Figure 11:
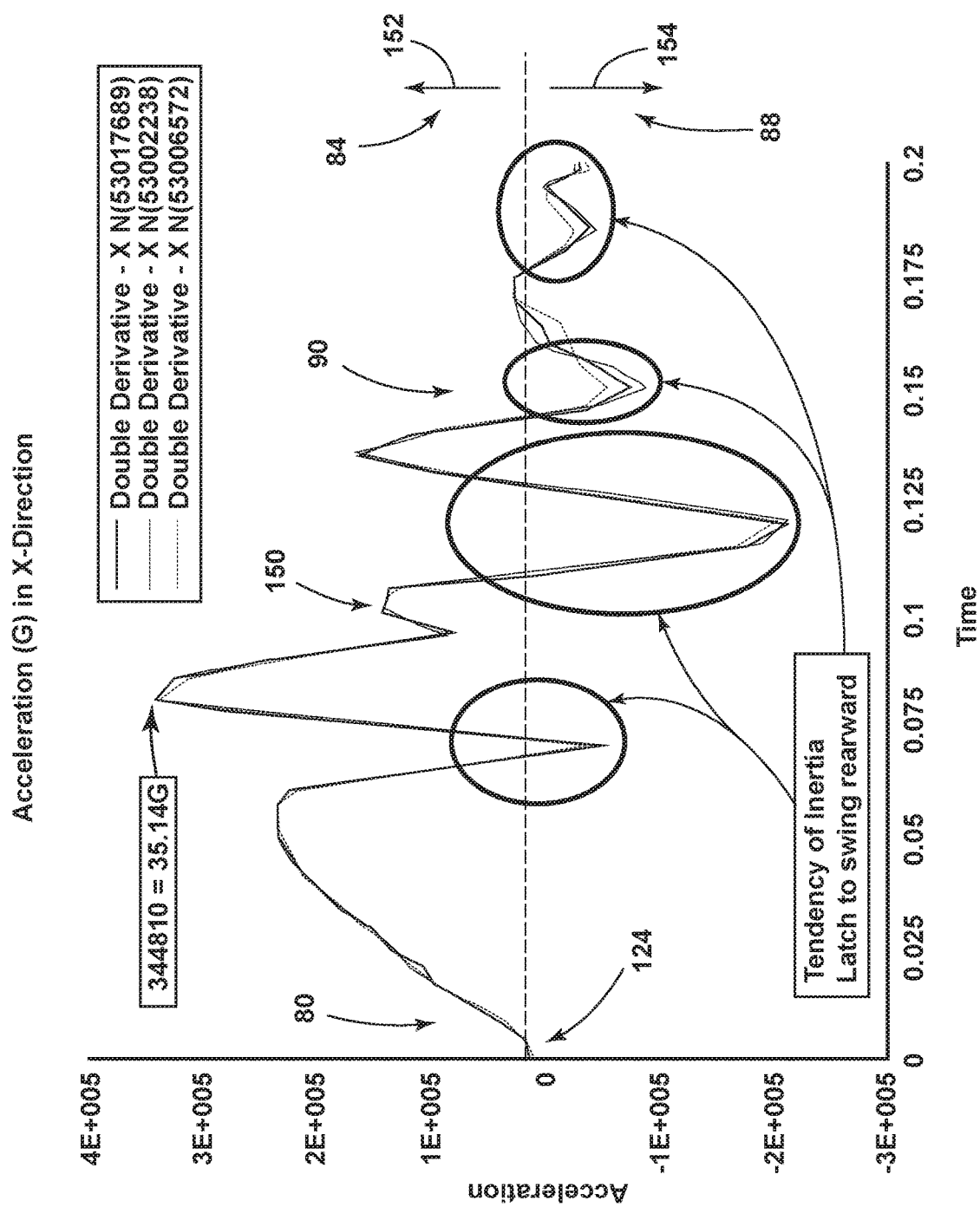
FIG. 11 is a schematic view of an exemplary dynamic oscillation of forces experienced by a seatback during an exemplary impact condition.
Figure 12:
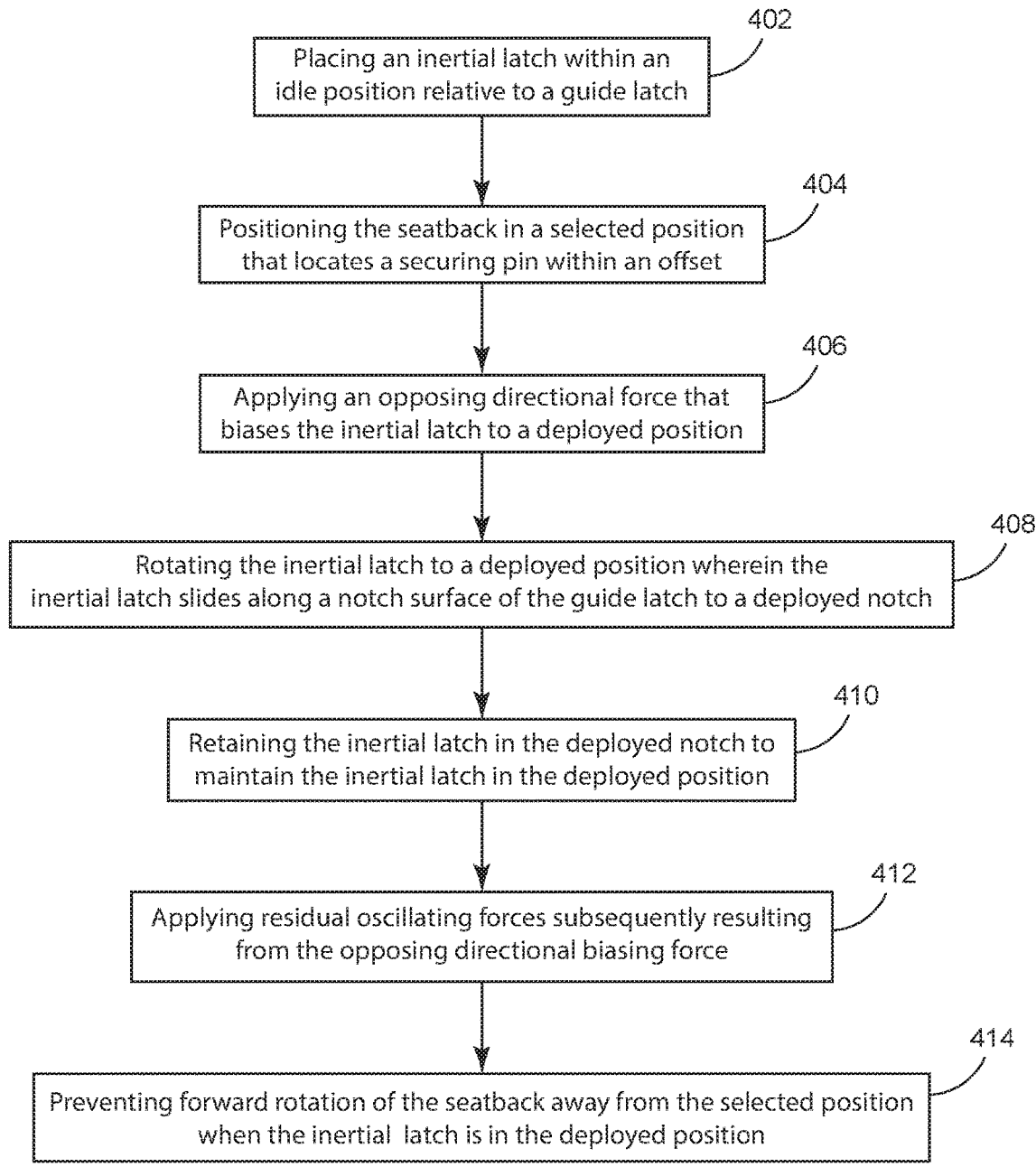
FIG. 12 is a schematic linear diagram illustrating a method for operating a seatback for a seat assembly using an aspect of the inertial latch.

Referring now to FIGS. 10 and 11, which represent exemplary and non-limiting impact conditions 80, studies have shown that during an impact condition 80, forces experienced by the vehicle 12 often result in dynamic oscillating forces 90. In this manner, the opposing directional biasing force 38 is exerted against components of the vehicle 12, including the seatback 16 of the various seating positions 10 in both the vehicle forward and vehicle rearward directions 84, 88. As shown in FIG. 10, the opposing directional biasing force 38, during the initial stages of a front impact condition 80, quickly increases in the vehicle forward direction 84. After this initial front impact, a series of dynamic oscillations 150 occurs such that the opposing directional biasing force 38 operates, sequentially, in the vehicle forward and vehicle rearward directions 84, 88. This acceleration of the seatback 16 is shown in FIG. 11 where the positive acceleration 152 of the opposing direction biasing force in a vehicle forward direction 84 and the negative acceleration 154 is indicative of the opposing directional biasing force 38 in a vehicle rearward direction 88. Accordingly, these studies show that the opposing directional biasing force 38 occurs in a dynamic oscillation 150 in each of the vehicle forward and vehicle rearward directions 84, 88. Using the inertial latch 30 that slidably engages the notch surface 50 of the guide latch 42, the inertial latch 30 can be maintained in the deployed position 36 throughout this dynamic oscillation 150 of the opposing directional biasing force 38. Whether the opposing directional biasing force 38 is exerted in a vehicle forward or vehicle rearward direction 84, 88, the engagement of the guide latch 42 with the inertial latch 30 maintains the latching assembly 52 in the deployed position 36 throughout the process of the impact condition 80.

Referring again to FIGS. 5-9, the seating position 10 of the vehicle 12 can include the base 14 having the seat pivot 26, a latch pivot 32 and a guide pivot 62. The seatback 16 is rotationally operable about the seat pivot 26 between the plurality of rotational positions 40. The securing pin 28 is attached to the seatback 16 and is operable through an operational path 64 and about the seat pivot 26. The latching assembly 52 includes the inertial latch 30 that operates about the latch pivot 32 and a guide latch 42 that operates about the guide pivot 62. The inertial latch 30 and the guide latch 42 are biased toward one another using a biasing mechanism 60 and slidably operate against one another between an idle position 34 and a deployed position 36. The guide latch 42 includes a notch surface 50 that selectively retains the inertial latch 30 in the idle position 34 distal from the securing pin 28. In response to the opposing directional biasing force 38 that results from an impact condition 80, the notch surface 50 of the guide latch 42 secures the inertial latch 30 in the deployed position 36 that places the inertial latch 30 into selective engagement with a top portion 130 of the securing pin 28. Through this configuration, the deployed position 36 of the inertial latch 30 serves to hold the seatback 16 in a selected position 160 of the plurality of rotational positions 40. This selected position 160 is typically the upright position 22.

As exemplified in FIGS. 5-8, the notch surface 50 of the guide latch 42 includes the idle notch 44 and the deployed notch 46. The engaging member 86 of the inertial latch 30 slidably operates in response to the opposing directional biasing force 38 from the idle notch 44 toward the deployed notch 46. As discussed above, movement of the engaging member 86 of the inertial latch 30 from the idle notch 44 to the deployed notch 46 will typically occur during the initial stages of the impact condition 80, where there is extreme initial deceleration in the vehicle forward direction 84. Once in the deployed position 36, the secured engagement between the inertial latch 30 and the guide latch 42 prevents the inertial latch 30 from moving away from the deployed position 36 during the dynamic oscillation 150 of the opposing directional biasing force 38. Stated another way, the deployed notch 46 secures the inertial latch 30 in the deployed position 36 and resists residual and subsequent oscillating forces 90 that result from the impact condition 80. As discussed above, the opposing directional biasing force 38 can act on the vehicle 12 in a dynamic oscillation 150 whereby the opposing directional biasing force 38 acts in a vehicle forward direction 84 and vehicle rearward direction 88 throughout the process of the impact condition 80.

Having described various aspects of the inertial latch 30 and the latching assembly 52, a method 400 is disclosed for operating a seatback 16 for a seat assembly utilizing an inertial latch 30. According to the method 400, step 402 includes placing an inertial latch 30 within an idle position 34 relative to a guide latch 42. This will typically occur during installation of the vehicle seat either during manufacture or during servicing of the vehicle 12. The seatback 16 is then positioned in a selected position 160 of a plurality of rotational positions 40 that locates the securing pin 28 within the offset 140 defined between the inertial latch 30 and the securing pin 28 (step 404). This offset 140 is defined during the placement of the inertial latch 30 in the idle position 34. According to the method 400, an opposing directional biasing force 38 is experienced by the vehicle 12, where applying this opposing directional biasing force 38 biases the inertial latch 30 to the deployed position 36 (step 406). As discussed above, application of this opposing directional biasing force 38 typically occurs during a front-end collision or, more typically, a head-on collision where the vehicle 12 experiences an extreme deceleration resulting from the impact condition 80. According to the method 400, step 408 includes rotating the inertial latch 30 to the deployed position 36. In the deployed position 36, the inertial latch 30 slides along the notch surface 50 of the guide latch 42 from the idle notch 44 to the deployed notch 46. The inertial latch 30 is then retained in the deployed notch 46 to maintain the inertial latch 30 in the deployed position 36 (step 410). A residual oscillating force is applied subsequent to the initial application of the opposing directional biasing force 38 resulting from the impact condition 80 (step 412). This residual oscillation results in the opposing directional biasing force 38 being applied in the vehicle forward direction 84 and the vehicle rearward direction 88. As discussed above, the securing of the inertial latch 30 in the deployed position 36 serves to maintain the inertial latch 30 in the deployed position 36 regardless of the direction or magnitude of the opposing directional biasing force 38. Through this configuration of the inertial latch 30, step 414 of the method 400 includes preventing forward rotation of the seatback 16 away from the selected position 160 when the inertial latch 30 is in the deployed position 36.

The placement of the inertial latch 30 in the deployed position 36 and the securing of the inertial latch 30 in the deployed position 36 occurs during an extreme deceleration of the vehicle 12 during a front end or head-on impact condition 80. These types of collisions typically result in significant damage to the vehicle 12 that renders the vehicle 12 inoperable. Accordingly, movement of the inertial latch 30 back to the idle position 34 after the impact condition 80 is typically not desired. During any repairs of the vehicle 12 that may be performed to place the vehicle 12 back in an operative state, the vehicle seating position 10 may be repaired or replaced to place the new or repaired latching assembly 52 into the idle position 34.

As exemplified in FIGS. 5-8, the continual sliding engagement 48 of the guide latch 42 with the inertial latch 30 is intended to minimize the amount of play or wobble experienced between these components during typical operation of the vehicle 12. Because the biasing mechanism 60 biases these components toward one another, wobbling, clanking or other undesirable noises are minimized or eliminated during typical operation of the vehicle 12. In addition, the continual sliding engagement 48 between the guide latch 42 and the inertial latch 30 can be controlled such that a minimum magnitude of the opposing directional biasing force 38 can be calibrated to move the inertial latch 30 from the idle position 34 to the deployed position 36. A hard deceleration, such as a hard breaking event, which may not result in an impact condition 80, may move the inertial latch 30 a partial distance toward the deployed position 36. During such a movement of the inertial latch 30 relative to the guide latch 42, the continual sliding engagement 48 results in little, if any, noise, vibration, or other undesirable interaction between the components of the latching assembly 52.

According to the various aspects of the device, the latching assembly 52 having the guide latch 42 and the inertial latch 30 is incorporated for maintaining engagement of the inertial latch 30 in the deployed position 36 during an impact condition 80. This maintenance of the inertial latch 30 in the deployed position 36 serves to retain the seatback 16 in the upright position 22 during the dynamic oscillation 150 of forces experienced by the vehicle 12 during the impact condition 80. In particular, where a piece of cargo 120 is accelerated in a vehicle forward direction 84, it may occur where the piece of cargo 120 impacts the rear surface 122 of the seatback 16 during a negative acceleration 154 of the seatback 16 in the vehicle rearward direction 88. Because the inertial latch 30 is secured in the deployed position 36, the dynamic oscillation 150 of forces does not have the effect of removing the inertial latch 30 from the deployed position 36. Accordingly, throughout the various oscillating forces 90 experienced by the vehicle 12 during an impact condition 80, the inertial latch 30 is maintained in the deployed position 36 and the seatback 16 is maintained in the upright position 22.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat assembly comprising:
   a seatback rotationally coupled to a base at a seat pivot;
   a securing pin coupled with the seatback;
   an inertial latch operable about a latch pivot to define an idle position defined by the inertial latch biased distal from the securing pin, and a deployed position defined by an opposing directional force biasing the inertial latch into selective engagement with the securing pin wherein the seatback is maintained in a predetermined rotational position; and
   a guide latch biased against the inertial latch and having an idle notch and a deployed notch, wherein the idle notch selectively maintains the inertial latch in the idle position, and wherein the deployed notch secures the inertial latch in the deployed position in response to the opposing directional biasing force.

2. The vehicle seat assembly of claim 1, wherein the guide latch is in continual sliding engagement with the inertial latch.

3. The vehicle seat assembly of claim 2, wherein the inertial latch slides along a notch surface of the guide latch from the idle notch to the deployed notch in response to the opposing directional biasing force.

4. The vehicle seat assembly of claim 2, wherein the guide latch rotationally operates about a guide pivot that is distal from each of the seat pivot and the latch pivot.

5. The vehicle seat assembly of claim 2, wherein a biasing mechanism extends between the guide latch and the inertial latch and maintains the guide latch in the continual sliding engagement with the inertial latch.

6. The vehicle seat assembly of claim 5, wherein the biasing mechanism biases the inertial latch toward the idle position and biases the guide latch toward the inertial latch.

7. The vehicle seat assembly of claim 1, wherein the inertial latch in the deployed position engages a top portion of the securing pin and prevents forward rotation of the seatback.

8. The vehicle seat assembly of claim 7, wherein the inertial latch in the idle position defines an offset between the inertial latch and the securing pin, wherein the securing pin is rotationally operable with the seatback and within the offset between a plurality of rotational positions.

9. The vehicle seat assembly of claim 8, wherein the securing pin is rearward of the seat pivot, and wherein rotational operation of the seatback from an upright position to a downward position defines an initial upward rotation of the securing pin relative to the inertial latch.

10. The vehicle seat assembly of claim 1, wherein the inertial latch includes a downwardly extending weighted member that is acted on by the opposing directional biasing force toward the deployed position.

11. A vehicle seat comprising:
    a base having a seat pivot, a latch pivot and a guide pivot;
    a seatback rotationally operable about the seat pivot between a plurality of rotational positions;
    a securing pin attached to the seatback and operable about the seat pivot; and
    a latching assembly that includes an inertial latch that operates about the latch pivot and a guide latch that operates about the guide pivot, wherein the inertial latch and the guide latch are biased toward one another and slidably operate against one another between an idle position and a deployed position, wherein the guide latch includes a notch surface that selectively retains the inertial latch in the idle position distal from the securing pin and, in response to an opposing directional biasing force, secures the inertial latch in the deployed position that places the inertial latch into selective engagement with a top portion of the securing pin and holding the seatback in a selected position of the plurality of rotational positions, wherein the notch surface includes an idle notch and a deployed notch, wherein the inertial latch slidably operates in response to the opposing directional biasing force from the idle notch to the deployed notch.

12. The vehicle seat of claim 11, wherein the deployed notch secures the inertial latch in the deployed position and resists residual oscillating forces subsequently resulting from the opposing directional biasing force.

13. The vehicle seat of claim 11, wherein the inertial latch is in continual sliding engagement with the notch surface of the guide latch.

14. The vehicle seat of claim 13, wherein a biasing mechanism extends between the guide latch and the inertial latch and maintains the guide latch in the continual sliding engagement with the inertial latch.

15. The vehicle seat of claim 14, wherein the biasing mechanism biases the inertial latch toward the idle position and biases the guide latch toward the inertial latch.

16. The vehicle seat of claim 11, wherein the inertial latch in the idle position defines an offset between the inertial latch and the securing pin and the securing pin is rotationally operable with the seatback and within the offset between the plurality of rotational positions.

17. The vehicle seat of claim 11, wherein the inertial latch includes a downwardly extending weighted member that is acted on by the opposing directional biasing force toward the deployed position.

18. A method for operating a seatback for a seat assembly of a vehicle comprising steps of:

placing an inertial latch within an idle position relative to a guide latch;

positioning the seatback in a selected position of a plurality of rotational positions that locates a securing pin within an offset;

applying an opposing directional force that biases the inertial latch to a deployed position;

rotating the inertial latch to the deployed position wherein the inertial latch slides along a notch surface of the guide latch to a deployed notch;

retaining the inertial latch in the deployed notch to maintain the inertial latch in the deployed position;

applying residual oscillating forces subsequently resulting from the opposing directional biasing force, wherein the inertial latch remains within the deployed position.

19. The method of claim 18, further comprising a step of:

preventing forward rotation of the seatback away from the selected position when the inertial latch is in the deployed position.

\* \* \* \* \*